US007983312B2

(12) United States Patent
Shkunov et al.

(10) Patent No.: US 7,983,312 B2
(45) Date of Patent: Jul. 19, 2011

(54) METHOD AND APPARATUS FOR GENERATION AND AMPLIFICATION OF LIGHT IN A SEMI-GUIDING HIGH ASPECT RATIO CORE FIBER

(75) Inventors: Vladimir V. Shkunov, Torrance, CA (US); Alexander A. Betin, Manhattan Beach, CA (US); David A. Rockwell, Culver City, CA (US)

(73) Assignee: Raytheon Company, Waltham, MA (US)

( * ) Notice: Subject to any disclaimer, the term of this patent is extended or adjusted under 35 U.S.C. 154(b) by 94 days.

(21) Appl. No.: 11/891,328

(22) Filed: Aug. 9, 2007

(65) Prior Publication Data
US 2009/0041061 A1    Feb. 12, 2009

(51) Int. Cl.
*H01S 3/30*    (2006.01)
*H01S 3/098*   (2006.01)
(52) U.S. Cl. .............................................. 372/6; 372/19
(58) Field of Classification Search ........................ None
See application file for complete search history.

(56) References Cited

U.S. PATENT DOCUMENTS

| | | | |
|---|---|---|---|
| 3,838,358 A * | 9/1974 | Vanderleeden ................. | 372/99 |
| 4,791,648 A | 12/1988 | Vojak et al. | |
| 4,848,881 A | 7/1989 | Kahan et al. | |
| 5,046,809 A | 9/1991 | Stein | |
| 5,386,427 A | 1/1995 | Zayhowski | |
| 5,646,773 A | 7/1997 | Injeyan et al. | |
| 5,651,021 A | 7/1997 | Richard et al. | |
| 5,748,663 A * | 5/1998 | Chenausky ...................... | 372/64 |
| 5,864,644 A | 1/1999 | DiGiovanni et al. | |
| 5,909,529 A | 6/1999 | Bhagavatula | |
| 5,930,433 A | 7/1999 | Williamson et al. | |
| 6,014,391 A | 1/2000 | Byren | |
| 6,160,824 A | 12/2000 | Meissner et al. | |
| 6,229,939 B1 | 5/2001 | Komine | |
| 6,317,548 B1 | 11/2001 | Rockwell et al. | |

(Continued)

FOREIGN PATENT DOCUMENTS

DE    10211352 A1    9/2002

(Continued)

OTHER PUBLICATIONS

W. Koechner, Solid-State Laser Engineering, Springer-Verlag, New York, p. 30-31, 1999.

(Continued)

*Primary Examiner* — Minsun Harvey
*Assistant Examiner* — Sean Hagan
(74) *Attorney, Agent, or Firm* — Pillsbury Winthrop Shaw Pittman LLP

(57) ABSTRACT

A planar laser gain medium and laser system. The novel laser gain medium includes an active core having a high aspect ratio cross-section with a fast-axis dimension and a slow-axis dimension, signal claddings adapted to form reflective boundaries at fast-axis boundaries of the core, and a material adapted to minimize reflections at slow-axis boundaries of the core. In an illustrative embodiment, the laser gain medium is an optical fiber. The core and claddings form a waveguide adapted to control modes propagating in the fast-axis direction. When the laser gain medium is employed as a laser oscillator, a high reflectivity mirror and an outcoupler are positioned at opposite ends of the core to form a laser resonator adapted to control modes in the slow-axis direction.

58 Claims, 6 Drawing Sheets

U.S. PATENT DOCUMENTS

| | | | |
|---|---|---|---|
| 6,400,871 B1 | 6/2002 | Minden | |
| 6,477,295 B1 | 11/2002 | Lang et al. | |
| 6,529,318 B1 | 3/2003 | Kaneda et al. | |
| 6,570,702 B2 | 5/2003 | Wilcox et al. | |
| 6,888,859 B2 | 5/2005 | Weber et al. | |
| 6,904,219 B1* | 6/2005 | Fermann | 385/130 |
| 7,164,818 B2 | 1/2007 | Bryan et al. | |
| 7,193,771 B1 | 3/2007 | Smith et al. | |
| 2002/0024727 A1 | 2/2002 | Wilcox | |
| 2003/0161375 A1 | 8/2003 | Filgas et al. | |
| 2004/0095968 A1 | 5/2004 | Avizonis et al. | |
| 2007/0041083 A1* | 2/2007 | Di Teodoro et al. | 359/333 |

FOREIGN PATENT DOCUMENTS

| | | | |
|---|---|---|---|
| EP | 0277768 A | 8/1988 |
| GB | 2366447 A | 3/2002 |
| WO | 9424734 A | 10/1994 |
| WO | 0027000 A | 5/2000 |
| WO | 2004066458 A | 8/2004 |

OTHER PUBLICATIONS

M. Digonnet, Ed., Rare-Earth-Doped Fiber Lasers and Amplifiers, Optical Engineering, Marcel Dekker, p. 1-15, 2001.

M. E. Fermann, Single-mode excitation of multimode fibers with ultrashort pulses. Optics Letters, vol. 23 No. 1, p. 52-54, (1998).

V. Bhagavatula et al, Progress in High Power Fiber Lasers, SPIE, vol. 5335, p. 210-216, 2004.

J. Dawson et al. Large flattened mode optical fiber for reduction of nonlinear effects in optical fiber lasers, SPIE, vol. 5335, p. 132-139, 2004.

J.P. Koplow et al., Single-mode operation of a coiled multimode amplifier, Optica Letters, vol. 25 No. 7, p. 442-444, 2000.

R. Scheps, Laser Diode-Pumped Solid State Lasers, SPIE Press, Bellingham, p. 41-43, 2002.

Anping Liu et al. Spectral Beam Combining of High Power Fiber Lasers, SPIE, vol. 5335, p. 81-88, 2004.

Philip C.D. Hobbs, Building Electro-Optical System, John Wiley & Sons, Inc., NY, p. 27-28, 2000.

S. Augst et al., Coherent beam combining and phase noise measurements of ytterbium fiber amplifiers, Optics Letters, vol. 29 No. 5, p. 474-476, 2004.

E. Cheung et al., Mode-locked pulsed fiber array scalable to high power, SPIE, vol. 5335, p. 98-105, 2004.

P. Jakobsen et al, Diode-laser array modes: discrete and continuous models and their stability, J. Opt. Soc. Am. B, vol. 8 No. 8, p. 1674-1680, 1991.

C. Corcoran, R. Rediker, Operation of Five Individual Diode Lasers as a Coherent Ensemble by Fiber Coupling into an External Cavity,Appl.Phys.Lett vol. 59 p. 759-761,1991.

R. Moyer et al., Beam combination through stimulated Brillouin scattering, J. Opt. Soc. Am. B, vol. 5 No. 12, pp. 2473-2489, 1988.

M.L. Minden et al., Self-Organized Coherence in Fiber Laser Arrays, SPIE, vol. 5335, p. 89-97, 2004.

D.A. Rockwell, C.R. Giuliano, Coherent coupling of laser gain media using phase conjugation, Optics Letters, vol. 11 No. 3, 147-149, 1986.

B. Grime et al. Phasing of a two-channel continuous-wave master oscillator-power amplifier by use of a fiber phase-conjugate mirror, Opt. Lett., vol. 30, p. 2415-2417, 2005.

R. Beach et al, Scalable antiguided ribbon laser, J. Opt. Soc. Am. B, vol. 19 No. 7, p. 1521-1534, 2002.

P.K. Cheo et al. A High-Brightness Laser Beam From a Phase-Locked Multicore Yb-Doped Fiber Laser Array, IEEE PTL, vol. 13 No. 5, p. 439-441, 2001.

P.K. Cheo et al. Recent Advances in High-Power and High Energy Multicore Fiber Lasers, SPIE, vol. 5335, p. 106-115, 2004.

E. Bochove et al., Nonlinear mode competition and phasing in Yb-doped fiber amplifier, SPIE, vol. 5335, p. 151-157, 2004.

I. Ciapurin et al., Incoherent combining of 100-W Yb-fiber laser beams by PTR Bragg grating, SPIE, vol. 4974, p. 209-219, 2003.

L. Lombard et al., Diffraction-limited polarized emission from a multimode ytterbium fiber amplifier after a nonlinear beam converter, Opt Lett, vol. 29 No. 9, p. 989-991, 2004.

D. Shepherd et al., High-power planar dielectric waveguide lasers, J. of Physics D: Appl. Physics, 34, p. 2420-2432, 2001.

X. Ye et al., Diode pumped 18W Long Nd: glass Waveguide Laser, 21st Annual Conf. on Advanced solid state phototonics, Report TuB17, 2006.

Theodor Tamir, (Ed.) Guided-Wave Optoelectronics, Springer-Verlag, Berlin, p. 18-20, p. 62-63, 1988.

A. Siegman, Lasers, University Science Books, Mill Valley, p. 558-565, 1986.

V. Gapontsev et al., 2 kW CW ytterbium fiber laser with record diffraction-limited brightness, 2005 Conf. on Laser and Electro-Optics Europe, Munich, p. 508.

A. Sharma et al., Tracing rays through graded-index media: a new method, Appl. Opt., v. 21 No. 6, p. 984-987, 1982.

A. E. Siegman, Propagating modes in gain-guided optical fibers, J. Opt. Soc. Am. A, vol. 20 No. 8, p. 1617-1628, 2003.

Born et al. "The Refracting Telescope", Principles of Optics, Electromagnetic Theory of Propagation, Interference and Diffraction of Light, Chapter 6.3, pp. 267-268, Cambridge University Press, 1968.

Neumann "Wave Beam Guided by a Straight Single-Mode Fiber", Chapter 2.2-2.4, pp. 12-16, Single-Mode Fibers Fundamentals, Springer-Verlag, NY, 1988.

Neumann "The Fundamental Fiber Mode", Chapter 5, pp. 61-141, Single-Mode Fibers Fundamentals, Springer-Verlag, NY, 1988.

Tamir "Waveguide Horns", Chapter 3.5, pp. 125-134, Guided-Wave Optoelectronics, Springer-Verlag, Berlin, 1988.

Bass et al "Optical Elements", pp. 6.22, Handbook of Optics, vol. 11, Devices, Measurements and Properties, McGraw-Hill, Inc. NY, 1995.

Bass et al. "Axial Gradient Lenses", pp. 9.5, Handbook of Optics, vol. 11, Devices, Measurements and Properties, McGraw-Hill, Inc. NY, 1995.

Taverner et al. "158-uJ Pulses from a Single-Transverse-Mode, Large-Mode-Area Erbium-Doped Fiber Amplifier", pp. 378-380, Optics Letters, vol. 22, No. 6, Mar. 15, 1997, Optical Society of America.

Arkwright et al. "Experimental and Theoretical Analysis of the Resonant Nonlinearity in Ytterbium-Doped Fiber", pp. 798-806, Journal of Lightwave Technology, vol. 16, No. 5, May 1998.

Snyder et al. "Step-Profile Waveguides", Chapter 12, pp. 239-248, Optical Waveguide Theory, Kluwer Academic Pubishers, Boston, 2000.

Koechner "Thermo-Optic Effects and Heat Removal", Chapter 7, pp. 406-468, Optical Sciences, Solid-State Laser Engineering, Fifth Edition, Springer-Verlag, NY, 2000.

Siegman "Propagating Modes in Gain-Guided Optical Fibers", pp. 1617-1628, Optical Society of America, vol. 20., No. 8, Aug. 2003.

Hecht "Optical Systems", Chapter 5.7, pp. 209, Optics, Fourth Edition, Pearson Education, Singapore, 2004.

Witkowska et al. "All-Fiber Anamorphic Core-Shape Transitions", pp. 2672-2674, Optics Letters, vol. 31, No. 18, Sep. 15, 2006, Optical Society of America.

Ramachandran et al. "Scaling to Ultra-Large-Aeff Using Higher-Order-Mode Fibers", 2 pp., CThAA2, Conference on Lasers and Electro-Optics 2006 Technical Digest, Optical Society of America.

Oh et al. "Increased Pulsed Amplifier Efficiency by Manipulating the Fiber Dopant Distribution", 2 pp., CTuQ3, Conference on Lasers and Electro-Optics 2006 Technical Digest, Optical Society of America.

Dong et al. "Leakage Channel Optical Fibers with Large Effective Area", pp. 1689-1697, vol. 24, No. 8, Aug. 2007, Optical Society of America.

Marciante "Gain Filtering for Single-Spatial-Mode Operation of Large-Mode-Area Fiber Amplifiers", 2 pp., JTuA86, Conference on Lasers and Electro-Optics 2007 Technical Digest, Optical Society of America.

Betin et al. "200 W Phase-Conjugate Mirror for CW Radiation", pp. 1-6, Sciencedirect, Optics Communications, Feb. 26, 2008.

Galvanauskas et al. "Effectively-Single-Mode Large Core Passive and Active Fibers with Chirally-Coupled-Core Structures", 2 pp., CMB1, Conference on Lasers and Electro-Optics 2008 Technical Digest, Optical Society of America.

D. P. Shepherd, et al. "High-Power Planar Dielectric Waveguide Lasers"; Journal of Physics D (Applied Physics); IOP Publishing UK; vol. 34, No. 16; pp. 2420-2432; Aug. 21, 2001; XP002511994.

International Search Report for International Patent Application No. PCT/US2008/083734, dated Feb. 9, 2009.

* cited by examiner

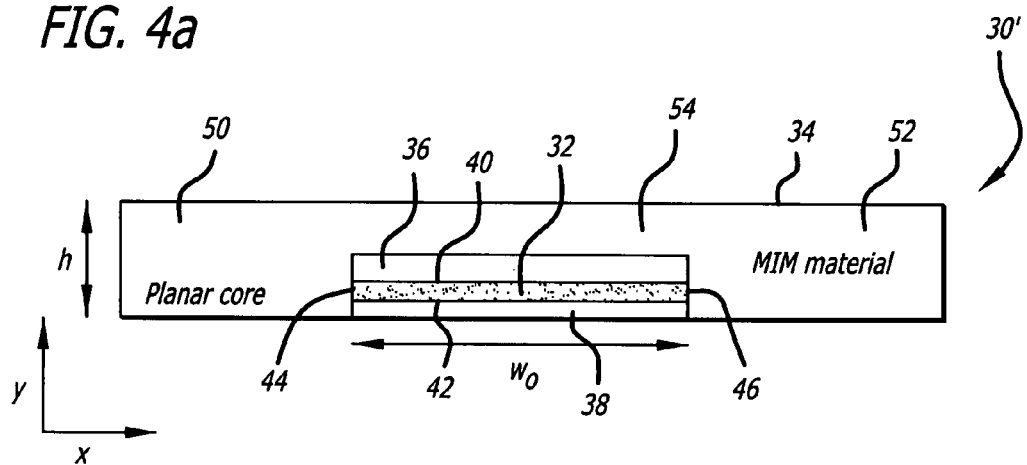
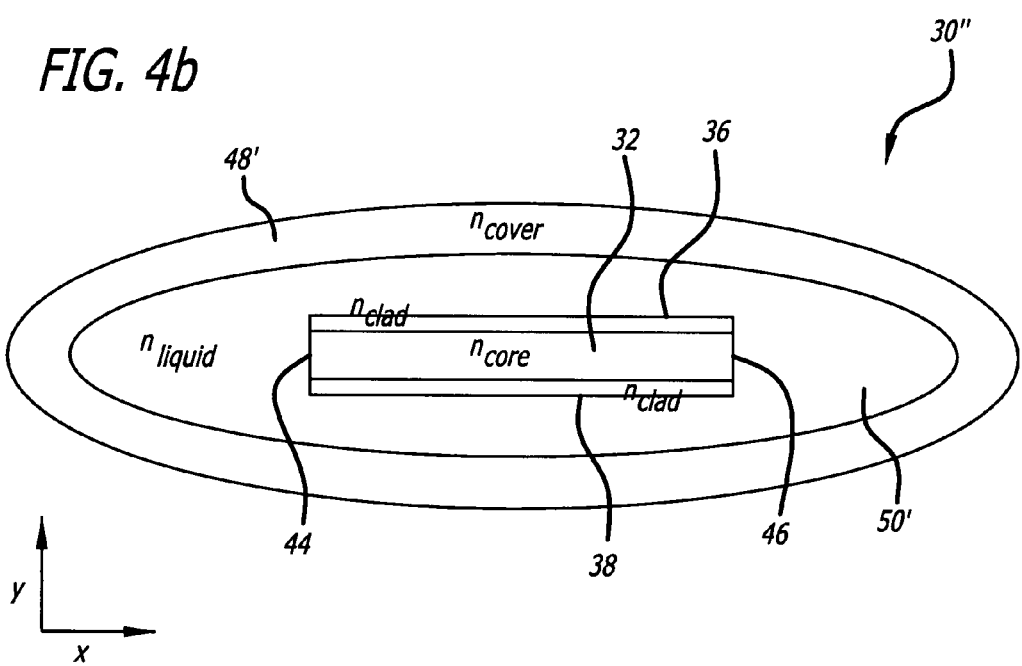

METHOD AND APPARATUS FOR GENERATION AND AMPLIFICATION OF LIGHT IN A SEMI-GUIDING HIGH ASPECT RATIO CORE FIBER

BACKGROUND OF THE INVENTION

1. Field of the Invention

The present invention relates to laser systems. More specifically, the present invention relates to systems and methods for generating and amplifying laser energy.

2. Description of the Related Art

High energy and high power laser systems generate optical beams for applications such as laser weapons, industrial lasers for materials processing, and long range lidar/ladar systems. (Energy and power are related, but fundamentally different, physical parameters. The challenges in scaling lasers to higher energy and power are often similar, but not always so. The present invention can be adapted to either energy or power scaling. Throughout the remainder of this discussion, the term power will be used with the understanding that this invention can also be used to increase energy.) One of the most challenging problems for scaling laser output power has proven to be beam quality reduction, which arises from the increased cross-sectional area of the active medium, as well as from thermal effects, optical damage, and nonlinear processes that are initiated in the laser materials at high optical intensities.

Solid-state lasers (SSLs) have many packaging advantages when compared to liquid or gas lasers. Diode pumped SSLs appear to be among the most power-efficient laser designs. In general, there are two alternative routes to diode-pumped SSL systems today. Bulk active elements for SSL applications are shaped as rods or slabs, or, recently, as planar waveguides (PWGs) that allow for a large beam cross-section to eliminate optical damage and to provide a more favorable thermal geometry. Bulk elements are usually made of a heat conducting crystalline material to facilitate cooling. Large size crystals, however, suffer from poor optical quality, and are expensive to manufacture. This factor limits the power scalability of crystalline bulk systems.

Active elements of SSLs can also be made from glass. Glass is inexpensive, clear, isotropic and a low-absorbing material. Cooling bulk glass elements is complicated, however, because of the low thermal conductivity of glass.

The optical fiber configuration solves this thermal management problem: the large surface-area-to-volume ratio can maintain a low core temperature even at high lateral gradient. Fiber lasers have proven to be more power-effective SSL devices than bulk rods or slabs. They include a small active core that provides for excellent spatial overlap between absorbed pump power and the signal beam and ensures heavily saturated operation, both of which make fiber lasers highly efficient. Moreover, fibers can be designed to minimize power lost due to fluorescence and amplified spontaneous emission (ASE). In addition, fiber designs are compact, flexible, and lightweight. Exceptional power efficiency and significant packaging benefits have positioned fiber lasers as one of the most promising candidates for high power laser applications, including airborne high-energy weapons and lidar/ladar sensors.

On the other hand, the small cross-sectional area of fibers, which is advantageous for beam quality, heat dissipation, and gain saturation, becomes a real problem if one wishes to scale the output power to higher levels. Optical damage and non-linear optical effects both arise at high light intensity. So, when attempting to increase laser output while maintaining high beam quality (BQ), the dilemma of choosing between bulk crystal or glass active elements and fiber gain elements has not yet been resolved.

Considering the specific case of fiber-based lasers and amplifiers, the applicability of traditional active fibers for building high-energy laser and long distance lidar/ladar sources is limited. Single transverse mode operation is typically necessary for high intensity on target, for accurate pointing, and for beam control, but such operation usually requires that the core diameter be small. However, if the core is too small, optical damage can preclude reliable operation. In modern silica glass fibers, reliable operation requires intensities to be maintained below 2 W/$\mu$m$^2$ (200 MW/cm$^2$) for CW (continuous wave) applications and about 2 GW/cm$^2$ for nanosecond-range pulses. Nonlinear phase modulation and various types of stimulated scattering occur for common fibers at power levels of several hundred watts, resulting in spectral broadening, locking longitudinal modes, and degraded coherence. Thermal damage of pump combiners represents another challenge.

Large mode area (LMA) fibers are commonly used for high power fiber lasers to overcome damage and nonlinearity problems. However, the increased core size cannot generally be made to operate only in a single mode, because the numerical aperture (NA) required for single-mode operation at large core sizes is lower than can be reliably achieved. Specifically, in existing fibers, the limited fine control of the core index increment restricts the NA to levels above 0.05. Another problem with the low-NA fibers is that they are sensitive to bending, and this fact complicates packaging. Different guiding-core structures and shapes to spread the mode size have been studied, including the addition of extra refractive index walls between the circular core and cladding. Coiling a fiber to strip out higher-order modes has been proposed and successfully used to select the lowest-order mode for LMA fiber lasers. Such efforts have resulted in the ability to raise the core diameter up to 30-50 $\mu$m. For core sizes larger than that, straight rod-like fibers have been shown to be useful for a high quality output beam.

The highest power reported for a nearly single-transverse mode fiber laser is presently about 3 kW. This power level approaches the practical limits estimated to be as high as 5-10 kilowatts for the CW regime. In the q-switched regime with nsec pulse durations, the state of the art is a few mJ, or peak powers of a few MW. Weapons-class applications, however, typically set 100 kW as a threshold for the laser system to become practically significant, and typical ladar sensor applications require peak powers of 10 MW or more. Few solutions have been proposed that can scale the output power of individual fiber lasers to this level. Most known proposed solutions involve combining parallel single-mode or LMA fiber channels. In principle, with this approach, the output power increases in proportion to the number of channels. However, maintaining a high beam quality and achieving a high combining efficiency (which means that the total combined power is equal to the sum of the powers of the individual fibers) have proven to be a challenge when addressing high power lasers.

In spite of extended efforts, fiber combining schemes have never reached the power levels achieved by direct LMA fiber sources. Nonlinear optical, thermal, and gain-saturation affects have so far limited the output power of fiber-combining schemes to a level that is nearly an order of magnitude below that possible with LMA designs. This suggests that fiber combining methods may not be capable of meeting the requirements of the intended applications.

An analysis of the present state of the art suggests that existing methods of raising fiber-laser output powers (either singly or combination) above 10 to 20 kilowatts are not capable of also delivering a high output beam quality.

Hence, a need exists in the art for an improved system or method for generating or amplifying higher output power laser beams than can be achieved with prior approaches, while maintaining high output beam quality.

SUMMARY OF THE INVENTION

The need in the art is addressed by the laser gain medium and laser system of the present invention. The novel laser gain medium includes an active core having a high aspect ratio cross-section with a fast axis and a slow axis, claddings adapted to provide waveguiding by means of total internal reflection at the fast-axis boundaries of the core, and a material adapted to avoid waveguiding by minimizing reflections at the slow-axis boundaries of the core (the fast-axis direction is across the thin dimension of the core, while the slow-axis direction is along the wide dimension of the core). In an illustrative embodiment, the laser gain medium is an optical fiber. The core and claddings form a waveguide adapted to control modes propagating in the fast-axis direction. When the laser gain medium is employed as a laser oscillator, a high reflectivity mirror and an outcoupler are positioned at opposite ends of the core to form a laser resonator adapted to control modes in the slow-axis direction. When the laser gain medium is employed as a laser amplifier, a high slow-axis beam quality of the output beam is achieved by, first, injecting an input signal beam that has a high beam quality, and second, exploiting gain guiding to preserve the high beam quality even in the presence of imperfect homogeneity of the fiber gain medium.

BRIEF DESCRIPTION OF THE DRAWINGS

FIG. 4a is a simplified schematic showing a cross-sectional view of a fiber designed in accordance with an alternative embodiment of the present invention, for the case of asymmetrical location of the core inside the fiber foil.

FIG. 4b is a simplified schematic showing a cross-sectional view of a fiber designed in accordance with an alternative embodiment of the present invention, in which the inner cladding is made from a liquid or gel material.

FIG. 5b is a simplified schematic showing an example of an optimized resonator geometry for the illustrative laser configuration of FIG. 5a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
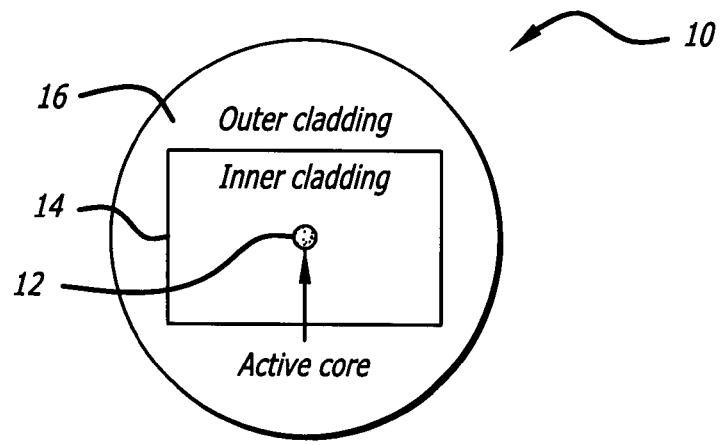
FIG. 1a is a simplified schematic showing a cross-sectional view of a conventional cladding-pumped (double-clad) active fiber.

FIG. 1a is a simplified schematic of a conventional cladding-pumped active fiber 10. Active fibers are typically manufactured in a double-clad configuration, having a small round core 12 capable of propagating a single mode or perhaps a few modes. The core 12 is surrounded by two claddings: an inner cladding 14 that directly surrounds the core 12, and an outer cladding 16 that surrounds the inner cladding 14. The core 12 and inner cladding 14 are doped with phosphorus and/or other dopants to produce total internal reflection (TIR) at the core-cladding interface by making the refractive index $n_{core}$ of the core 12 larger than the refractive index $n_1$ of the surrounding inner cladding 14, $n_1 < n_{core}$. Rare-earth ions such as Yb, Nd, Er, Tm, Ho and others, as well as their combinations, are used for activating the core 12 for light amplification. The inner cladding 14 is imbedded into another cladding 16, of even lower refractive index $n_2 < n_1$, for trapping pump light inside the inner core via TIR. Varying the refractive index using various dopants, as described above, is only one way to achieve a prescribed reflection at the core-cladding interface. An alternative approach well known in the existing art is to use photonic bandgap (PBG) or photonic crystal (PC) micro-structures, whereby the signal is trapped in the core due to Bragg scattering from a pattern of holes or rods contained within the cladding.

Figure 1B:
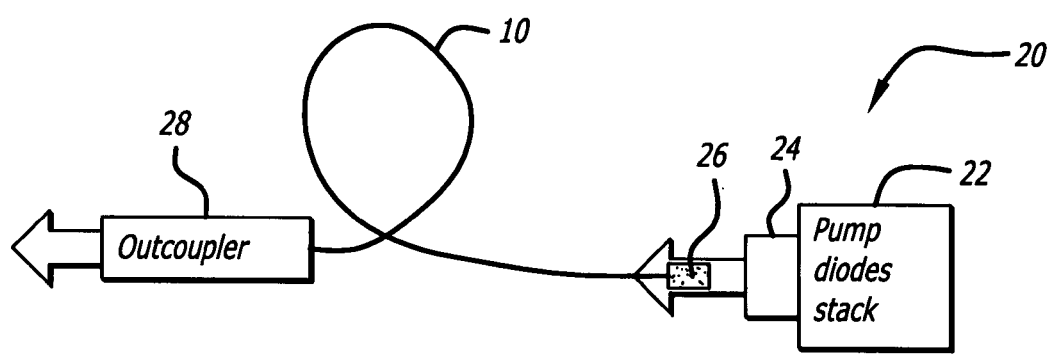
FIG. 1b is a simplified schematic of a typical fiber laser system.

FIG. 1b is a simplified schematic of a typical fiber laser system 20. Diode lasers 22 provide pump radiation that is pumped into the inner cladding of the fiber 10, typically at an end of the fiber 10 via pump coupling optics 24. Lasing is excited in the fiber core, usually between a Bragg grating reflector 26 located at the pump entry end of the fiber 10 and an outcoupler 28 at the opposite end. As discussed above, traditional active fibers are not capable of providing simultaneous high power output and good beam quality for high-energy laser applications.

In accordance with the present teachings, the contradiction between high output power and good beam quality is resolved by means of making a laser that is incapable of propagating and/or amplifying any light except for the single lowest-order transverse mode, even for a large beam cross-section and for conditions of strong thermal and nonlinear optical effects in the active medium. The combination of (a) single-mode guiding for the fast-axis direction, along with (b) resonator mode selection for the orthogonal slow-axis direction, allows for a solution for the problem of power limitation by restricted fiber mode size. Making the mode-selectors purely refractive, in combination with extra tools for fine tuning the resonator mode, allows for a system that is robust to high power operation.

Figure 2A:
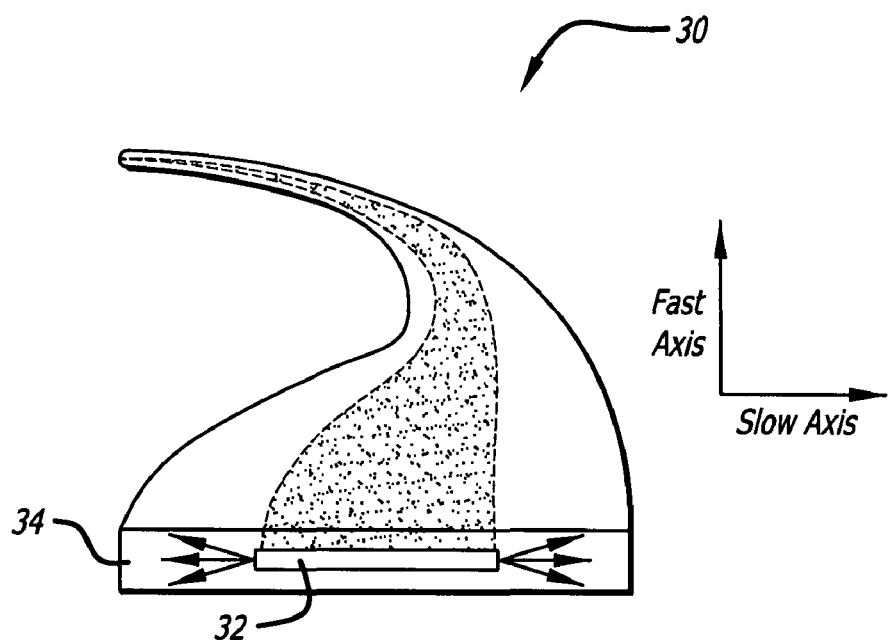
FIG. 2a is a simplified schematic of a fiber designed in accordance with an illustrative embodiment of the present invention.

FIG. 2a is a simplified schematic of a semi-guiding, high aspect-ratio core (SHARC) fiber 30 designed in accordance with an illustrative embodiment of the present invention. The novel fiber 30 includes a thin, doped, high aspect-ratio core 32 (the width can exceed the core thickness by a factor greater than 50), buried inside a flexible ribbon-like glass foil 34. The idea is to accommodate higher power by expanding a conventional single mode or LMA fiber core in one dimension only, instead of two dimensions, as would be the case if one simply increased the radius of a circular core. For a high aspect-ratio core, the coordinate along the expanded dimension is traditionally referred to as the slow axis, while the narrow dimension is denoted the fast axis. The cross-sectional area of the expanded core is specified to maintain a constant and safe intensity level as the total beam power is increased. The damage-limited output power increases proportionally to the increase of the slow-axis core dimension.

The use of a planar structure for the fiber core 32 allows for an increase in the core cross-sectional area, and therefore output power, without a corresponding increase in the signal intensity. If desired, the claddings and protective jacket can maintain a circular outer shape even for a high-aspect ratio planar core. In the preferred embodiment, however, both the inner pump-light cladding and the outer cladding are made planar as well. The entire structure of the SHARC fiber 30 looks, then, like a ribbon. SHARC fibers are especially attractive for high-power applications because of the effective heat transfer through the planar surfaces. It is more effective as compared to the radial heat flow in traditional circular-core fibers: the same core volume provides a much larger surface area for the SHARC fiber configuration. Moreover, the thin foil 34 diminishes the path length for heat across the foil 34 along the fast-axis direction, greatly decreasing the active core temperature as compared to bulk active elements.

In an illustrative embodiment described more fully below, the thin glass foil 34 has an embedded planar core with planar signal claddings and a mode-index matching (MIM) material along the core edges. The MIM material has a refractive index such that the core is optically "open" (i.e. there are no reflections) at the core-MIM material interface, allowing the amplified signal to overfill the active portion of the core in the slow-axis direction. The foil may be covered by low-index outer-cladding material for guiding the pump light and isolating it from the outside environment.

Figure 2B:
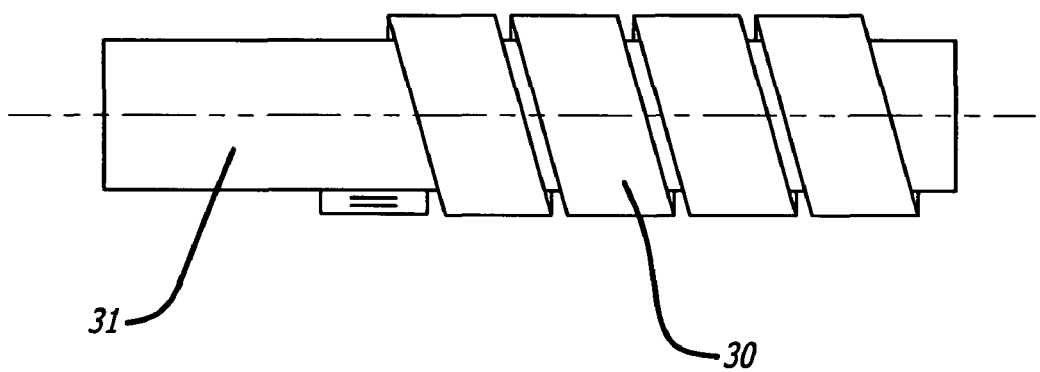
FIG. 2b is a simplified schematic of a fiber coiled around a cylinder designed in accordance with an illustrative embodiment of the present invention.

In the preferred embodiment, the SHARC fiber 30 is made from optical glass (although crystals and other host materials can be used without departing from the scope of the present teachings). Different types of glass can be employed, including silica and phosphate glasses. The great advantage of a glass material is that there is practically no limit to the core length, and high-quality glass shows very small intrinsic losses. A glass SHARC fiber is still very thin and flexible, retaining all of the advantages of fibers, including the possibility of coiling around a cylinder at packaging, as shown in FIG. 2b. FIG. 2b is a simplified schematic of a SHARC fiber 30 designed in accordance with an illustrative embodiment of the present invention, showing the fiber 30 coiled around a cylinder 31.

High aspect ratio cores have been used for decades to increase the power of edge-emitting semiconductor diode lasers and, more recently, planar waveguide bulk crystalline active slabs and bulk phosphate glass waveguide lasers. See, for example, the following references, the teachings of which are incorporated herein by reference:
1) U.S. Pat. No. 5,651,021. Richard; James and McInnes; Alasdair. Diode pumped slab laser, Jan. 18, 1996;
2) D. Shepherd, et al. *High-power planar dielectric waveguide laser*. J. of Physics. D: Applied Physics, 34, 2420-2432 (2001);
3) U.S. Pat. No. 6,160,824. Meissner; Helmuth E. and Meissner; Oliver R. Laser-pumped compound waveguide lasers and amplifiers, Nov. 2, 1998;
4) U.S. Pat. No. 4,791,648. Vojak; Bruce A. and Sheem; Sang K. Laser having a substantially planar waveguide, Feb. 4, 1987;
5) X. Ye, at al. *Diode Pumped 18W Long Nd: Glass Waveguide laser*. Proceedings of 21st Annual Conf. on Advanced Solid State Photonics, Report TuB17 (2006).

These planar structures share the major problem of how to provide and sustain good beam quality operation in the slow-axis direction, a challenge that is addressed by the present invention. As is true for all guided laser media (and unguided media as well), good beam quality typically requires that some means be employed to control the modes that are allowed to exist. The present invention incorporates mode control that is embodied in both the method and design.

A key challenge for a SHARC fiber design is maintaining a single-mode output beam. Diffraction processes with respect to the slow and fast axes, respectively, become decoupled from one another when the core width greatly exceeds the core height. In accordance with the present teachings, light remains trapped by total internal reflection across the fast axis, but the propagation along the slow axis looks like planar 2-D diffraction for the guided mode. The beam quality problem can therefore be split and treated separately and differently for the two axes.

One major departure of the present invention from common fiber, bulk, and waveguide laser designs is that conventional index-based waveguiding techniques are employed to control the beam quality only in the fast-axis direction. Specifically, along the fast axis the present invention achieves single-mode propagation by optimizing the core and cladding dimensions and the refractive-index profile in that direction, and in some cases by optimizing the radius at which the SHARC fiber is coiled. In the slow-axis direction, conventional index-based waveguiding is not used. Instead, this invention teaches how to use a combination of waveguiding techniques in the fast-axis direction and several different approaches in the slow-axis direction.

Slow-axis beam-quality control depends on whether the fiber is being used as a laser oscillator or laser amplifier. For both a laser oscillator and a laser amplifier, the refractive index and the waveguide thickness should both be homogeneous. In addition, for a laser oscillator, an optimized planar resonator operating in the slow-axis direction should discriminate against higher-order resonator modes. Optimization involves specifying the properties of the resonator mirrors (radii of curvature, size, and spacing) and the index profile along the slow-axis direction. For a homogeneous laser amplifier, an input signal with a high beam quality will ensure a high beam quality at the output. Although this homogeneity requirement appears to be common with conventional amplifiers, a SHARC fiber amplifier actually allows a looser tolerance. This looser tolerance arises from the combination of the finite spatial width (in the slow-axis direction) and the long length of the gain stripe, along with the fact that the amplified signal will, by design, overfill the width of the gain stripe. Under these gain-guiding conditions, only that portion of the signal beam that has the highest beam quality will be efficiently amplified along the entire length of the fiber, while the distorted portions propagate out of the gain region, possibly assisted by a slow-axis index profile that provides anti-guiding.

Fiber Structure

Figure 3:
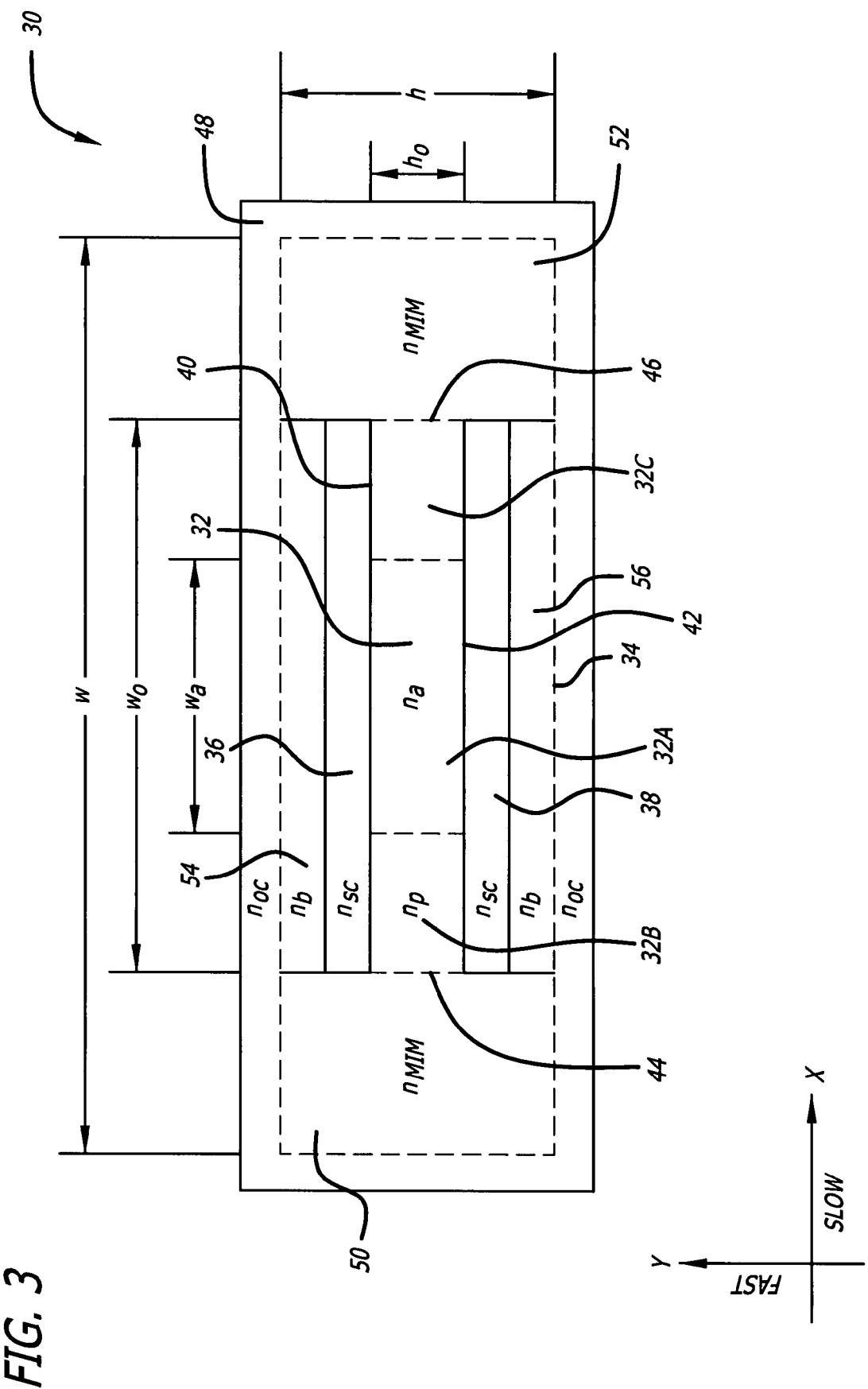
FIG. 3 is a simplified schematic of a cross-sectional view of a fiber designed in accordance with an illustrative embodiment of the present invention, showing the refractive indices over a fiber slice.

FIG. 3 is a simplified schematic of a cross-sectional view of an illustrative SHARC fiber 30 designed in accordance with an illustrative embodiment of the present invention, including a refractive index map (proportions are not to scale for improved clarity). The SHARC fiber 30 includes a high aspect-ratio core 32 of width $w_0$ and height (or thickness) $h_0$, with a top wide interface 40, a bottom wide interface 42, and two narrow edge interfaces 44 and 46.

In the illustrative embodiment of FIG. 3, the core 32 is shown divided into three adjacent regions: an active core region 32A of width $w_a$ and refractive index $n_a$ that is doped with a laser-active ion, and passive core regions 32B and 32C having a refractive index $n_p$ and located on either edge of the active core region 32A. This division is optional, and is shown here to represent the most general case. In practice, the active core region 32A could be as much as 100% of the full core width, or $w_a=w_o$; the relative width of the active core region is a design parameter that can be specified to optimize mode discrimination and/or mode-index matching.

An inner cladding 34 of height h and width w, comprised of two signal claddings 36 and 38 and two edge sections 50 and 52, surrounds the core 32. The first signal cladding 36 lies above the core 32 in contact with the top interface 40, and the second signal cladding 38 lies below the core 32 in contact with the bottom interface 42. The edge sections 50 and 52 are located to the sides of the core 32 and claddings 36 and 38, in contact with the narrow interfaces 44 and 46, respectively.

In an illustrative embodiment, the laser gain medium is configured as a thin glass foil. This foil has an embedded planar core with planar signal claddings, and a mode-index matching (MIM) material along the core edges. The MIM material has a refractive index such that the core is optically "open" (i.e. there are no reflections) at the core-MIM material interface, allowing the amplified signal to overfill the active portion of the core in the slow-axis direction.

The inner cladding 34 may be surrounded by an outer cladding 48 having a refractive index $n_{oc}$. The outer cladding 48 could be a polymer, a glass, or even air, depending on the application. The fiber 30 may also include optional ballast regions 54 and 56, having a refractive index $n_b$, above and below the signal claddings 36 and 38, respectively, lying between the signal cladding and the outer cladding 48. The homogeneity of the core regions 32 and the shape and flatness of the interfaces 40 and 42 with the signal claddings 36 and 38 should be controlled for the best signal beam quality. However, the homogeneity and shapes of the other regions and interfaces are not so critical and could even be curved.

In accordance with the present teachings, total internal reflection is used to trap light in the core 32 in the fast-axis direction. The signal claddings 36 and 38 have an index of refraction $n_{sc}$ that is smaller than the indices of refraction $n_a \approx n_p$ of the core 32, such that light in the core 32 is trapped by TIR at the top and bottom interfaces 40 and 42. Alternatively, instead of TIR arising from a core-cladding refractive-index difference, some other mechanism such as a photonic band gap (PBG) structure can be employed to accomplish the guiding function.

In a preferred embodiment, the numerical aperture (NA) and the thickness $h_0$ of the core 32 are matched to make the core 32 single-mode in the fast-axis direction. This can be done by satisfying the well known condition, $h_0 \approx \lambda/(2\Delta n \cdot n_a)^{1/2}$, where $\lambda$ is the wavelength of the laser and $\Delta n$ is the core-cladding index difference. Alternatively, the SHARC fiber 30 can be designed analogous to a LMA fiber, whereby the core guides a few fast-axis modes, and the SHARC fiber 30 is wound around a cylinder (as shown in FIG. 2b) at a prescribed coil radius to remove the higher-order modes. For reference, a standard core/cladding combination gives $h_0 \approx 5-10$ μm at a $NA_{core} \approx 0.2$ for single-mode circular fibers. The core size becomes about 20-30 μm for a $NA_{core} \approx 0.05$ for a LMA fiber core that simultaneously guides a few modes and where coiling is used for stripping off higher modes. Similar approximate relations between the core thickness and its NA can be used for the SHARC fiber 30 of the present invention. TIR from the lower-index cladding, then, facilitates beam quality with respect to the fast axis in the SHARC fiber 30.

Given the uniqueness of the slow-axis mode control employed in this invention, it is appropriate to describe how this affects the fiber design. Referring to FIG. 3, the best mode control can be obtained when the refractive index is essentially constant across the slow-axis interfaces 44 and 46 of the core 32, because this will minimize reflections. The refractive index $n_{MIM}$ of the mode-index matching (MIM) material 50 and 52 at the edges of the core 32 can be controlled by specifying the appropriate dopant concentrations in those sections 50 and 52 of the fiber 30. It is useful to note that the effective index, $n_{mode}$, of any given mode is typically not either $n_a$ or $n_{sc}$, but lies somewhere between those limits. The reason for this is that the electromagnetic fields that constitute the mode extend beyond the core 32 into the signal cladding 36 and 38, and also possibly into the surrounding ballast material 54 and 56. Hence, the objective of minimizing reflections at the edges of the core 32 can be achieved by designing the fiber such that $n_{MIM} \approx n_{mode}$. Thus, the material at the slow-axis edges does not actually function as "cladding"; its refractive index is chosen to provide a neutral condition, i.e. to lie in the middle between guiding and anti-guiding to eliminate trapping the light at the edges. The term "modes" for the illustrative SHARC fiber laser design should be clarified: the SHARC fiber has waveguide modes along the fast axis, while having laser resonator modes along the slow axis or having no index-guided modes at all for the slow-axis direction if an amplifier configuration is applied.

In a preferred embodiment, the following two conditions should be fulfilled to reach the design goal of optically open edges: 1) the indices, $n_{sc} < n_{MIM} < n_{a,p}$, should all be different, and 2) the guided-mode index $n_{mode}$ should match $n_{MIM}$, the index at the edges of the core.

In practice, either imperfect mode matching between $n_{mode}$ and $n_{MIM}$, or some other possible effects arising at the edges of the core, may be sufficient to cause the formation of modes as opposed to free diffraction in the slow-axis direction. The impact of any such modes can be minimized by ensuring that these undesired modes are leaky, i.e. that the power in such a mode will tend to migrate to the MIM material outside of the core edges, away from the gain stripe. One way to make modes leaky is to purposely violate the nominal equality between $n_{mode}$ and $n_{MIM}$.

Any suitable refractive index $n_b$ can be used for the ballast material in sections 54 and 56, immediately above and below the signal claddings 36 and 38, respectively. For example, the signal claddings 36 and 38 can extend to the top and bottom surfaces of the inner cladding 34, which essentially corresponds to $n_b=n_{sc}$. Alternatively, the material for the ballast sections 54 and 56 can be chosen to be the same as the material on the core edges, $n_b=n_{MIM}$. The index for the areas 54 and 56 can also be chosen to lie between those values, or slightly beyond this range. A final choice becomes a matter of performance optimization, manufacturing convenience, and outer cladding requirements for pump guiding. The outer cladding 48 may be used to guide the pump light and also to isolate the pump light from the external environment. The refractive index of the outer cladding, $n_{oc}$, should be less than the index of any material that constitutes the inner cladding 34.

Different variants for the core location inside the foil 34 are possible. As an example, the core can be centered in the fiber structure (as shown in FIG. 3), or it can be placed near one of the outer surfaces of the fiber (as shown in FIG. 4a) depending on thermal management and foil doping requirements. FIG. 4a is a simplified schematic showing a cross-sectional view of a fiber 30' designed in accordance with an alternative embodiment of the present invention, in which the core 32 is near the lower surface of the fiber structure 30'.

Another design variant is shown in FIG. 4b. FIG. 4b is a simplified schematic showing a cross-sectional view of a fiber 30" designed in accordance with an alternative embodiment of the present invention. In this embodiment, the guiding core 32 and signal claddings 36 and 38 are embedded within an inner cladding 50' made of a liquid or gel mode-index matched material. In this case, the design exploits the same basic idea of separating mode control for slow and fast axes, but it is based on a liquid or gel for the mode-index matching material. The soft MIM material 50' is fixed in place by a flexible external cover 48' that has a low index to serve as the outer cladding and to trap pump light. The signal claddings 36 and 38 are deposited as thin layers over large surfaces of the solid-state foil-type core 32.

Laser Resonator Architectures

In accordance with the present teachings, the novel SHARC fiber core is disposed within a laser resonator that is specially designed to control the planar resonator mode (in the slow-axis direction) that can propagate along the fiber. Methods for mode selection in a laser resonator with a circular cross-section active medium are well known in the art. See, for example, *Lasers* by A. Siegman, published by University Science Books, Mill Valley, p. 558-565, p. 47-48, 1986. Similar approaches can be used to control modes in the SHARC fiber of the present invention with respect to the slow axis.

Figure 5A:
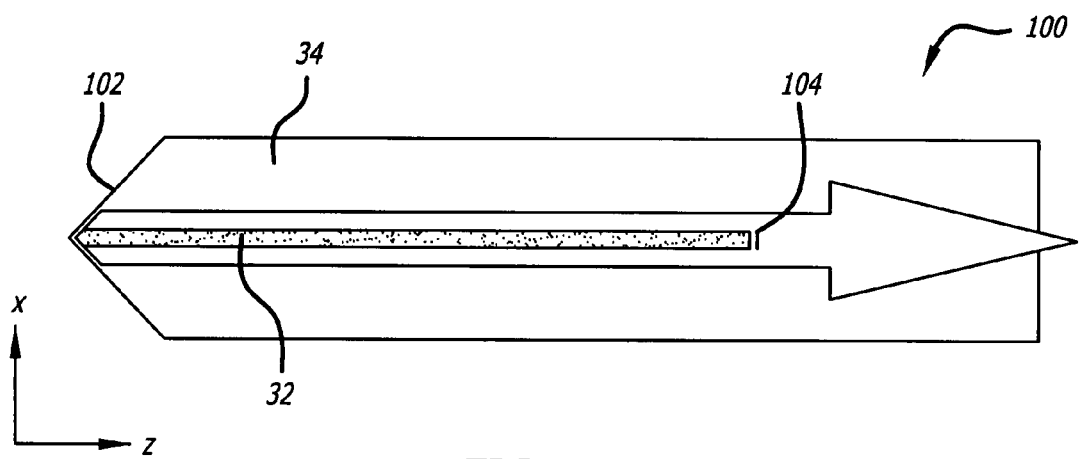
FIG. 5a is a simplified schematic showing a top view of a laser resonator designed in accordance with an illustrative embodiment of the present invention, where the resonator components are integrated into the glass foil and where the resonator reflector is implemented as a planar version of a Porro prism.

FIG. 5a is a simplified schematic of a laser system 100 designed in accordance with an illustrative embodiment of the present invention. The novel laser system 100 forms a laser resonator by positioning two reflectors, a large high reflectivity (HR) reflector 102 and a small, semi-transparent outcoupler 104, at opposite ends of the high-aspect ratio active core 32. The lowest-order planar resonator mode is favored over other higher-order modes by a proper choice of Fresnel number of the planar resonator, which is controlled by the resonator length and the size and/or curvature of the reflectors 102 and 104.

In a preferred embodiment, the HR mirror 102 and outcoupler 104 are integrated into the glass foil 34 of the fiber to avoid misalignment and surface damage issues and thereby to increase robustness and reliability. The idea here is to make a long and narrow fiber-like foil with the planar resonator along the slow axis having marginal stability, thereby obtaining strong discrimination against higher-order modes. Such a ribbon fiber physically resembles old-fashioned magnetic tapes but made of glass foil.

In a preferred embodiment, the outcoupler 104 has a low reflectivity of a few percent. Analysis shows that the lasing efficiency for that case remains high even for strong linear loss in the resonator. The linear loss appears either due to material absorption, or due to light scattering by imperfections, including scattering at small angles that couples the lowest-order resonator mode to the higher-order resonator modes. In a preferred embodiment, the size of the outcoupler 104 is chosen to produce a planar-resonator Fresnel number less than 1. For the embodiment on the FIG. 5a, the HR mirror 102 is implemented as a planar version of a Porro prism retroreflector. Other implementations of a planar HR mirror may also be used without departing from the scope of the present teachings.

Figure 5B:
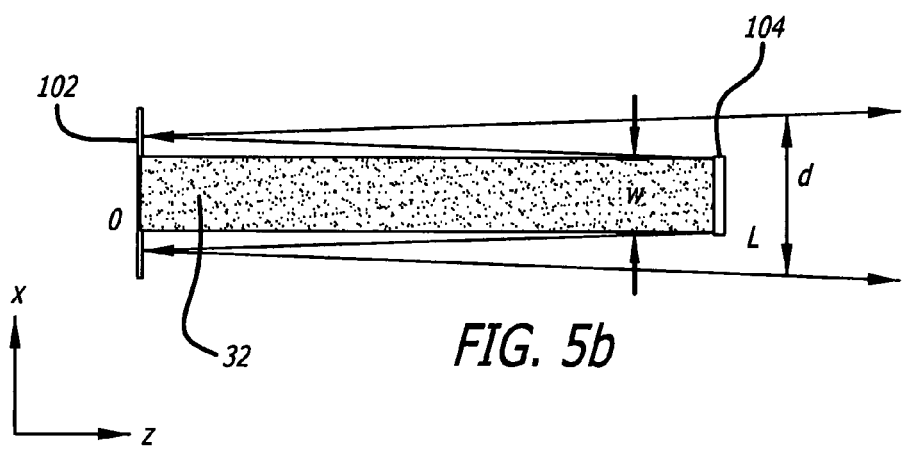

FIG. 5b is a simplified schematic showing an example of an optimized resonator geometry for the illustrative laser configuration of FIG. 5a. The active core width $w_a$ is taken constant along the fiber. Analysis shows that the best discrimination against higher-order modes takes place when: 1) the mode overfills the active portion of the core so that its average size d exceeds about twice the active-core width $w_a$, and 2) the mode size d exceeds the outcoupler size as well by a factor of about two.

In an illustrative embodiment, these two conditions can be satisfied by specifying a resonator length L that scales with the core width as $L \geq w_a^2(\pi n/4\lambda)$ and by selecting the outcoupler size to be equal to the core width $w_a$ (in this equation, n is the effective refractive index of the propagating mode). The size d of the lowest-order mode remains, then, almost constant along the fiber too, being about twice the width of both the active core and the outcoupler, $d \approx 2w_a$. As an example, for $w_a$ values of about a few millimeters, which could provide a high-power laser in a range of tens of kilowatts output, the corresponding SHARC fiber length L would range about ten meters.

Figure 6:
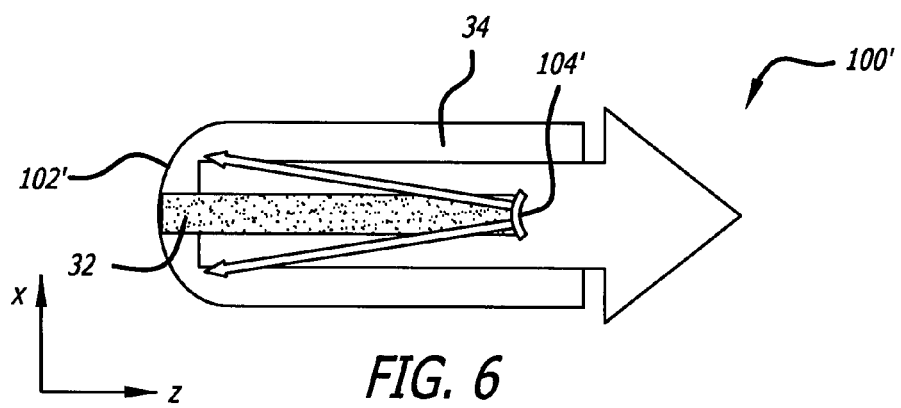
FIG. 6 is a simplified schematic of an alternative laser resonator architecture for planar mode selection designed in accordance with an illustrative embodiment of the present invention.

FIG. 6 is a simplified schematic of an alternative laser architecture 100' for planar-resonator mode selection designed in accordance with an illustrative embodiment of the present invention. In this design, which can provide mode control using a shorter resonator, the planar resonator is implemented as an unstable resonator that incorporates a curved outcoupler reflector 104' to select the lowest-order mode. The outcoupler 104' has a curvature such that the reflected beam is divergent, producing a similar mode selection effect as the resonator of FIG. 5a. The high-reflectivity mirror 102' can be made flat, concave or implemented as a TIR Porro prism reflector (as shown on the FIG. 5a). A planar version of the Porro prism reflector can be easily manufactured by properly cutting the foil 34.

An advantage of this laser configuration is that it can be made much shorter than the configuration shown in FIG. 5a. The lasing mode can be made wide even for a short unstable resonator. Standard conditions are known for introducing a strong loss for higher-order modes while maintaining an acceptable moderate loss for the lowest-order mode. The reflector sizes, width of the active core, and reflector curvatures should all be chosen properly for mode selection.

Another advantage of the resonator configuration shown in FIG. 6 is that it makes it possible to increase the core cross-section area even further without necessarily increasing the foil length. Hence, the unstable resonator configuration can be even more power-scalable than the long cavity configuration.

Figure 7:
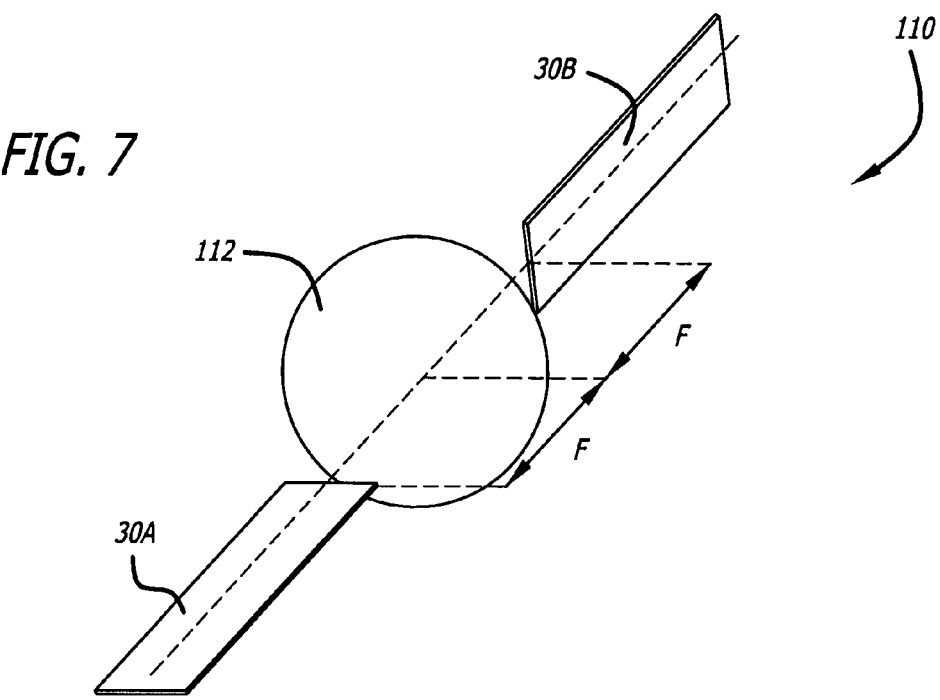
FIG. 7 is a simplified schematic of a multi-sectional laser system designed in accordance with an illustrative embodiment of the present invention.

FIG. 7 is a simplified schematic of an illustrative multi-sectional laser system 110 designed in accordance with an alternative embodiment of the present invention. In this embodiment, two or more separate sections of SHARC fibers 30A and 30B are interconnected sequentially, end to end, by either bulk or integrated focusing optics 112. A different method of mode selection is proposed here. This version does not involve matching the planar-resonator length to the size and curvature of the reflectors. Moreover, the edges of the core need not be optically open (i.e. reflections can be tolerated at the core edges). These differences simplify the fiber core structure and, eventually, ease the fiber manufacturing. The lowest-order mode is selected by designing the interconnections such that a huge propagation loss is induced for any planar core mode except for the lowest-order one.

In accordance with the teachings of the present invention, this is achieved by setting the orientations of the slow axes for neighboring ribbons to be orthogonal to each other. At the same time, the interconnecting optics 112 should be set to focus the output light of one ribbon core into the input of the next ribbon core. For bulk optics, a positive lens 112 can be positioned in the middle between the opposite section ends, which are spaced at a distance S equal to twice the focal length of the lens, S=2F, as shown in FIG. 7. The focal length F is chosen according to the relation $F \approx h_0 d/\lambda$, where $h_0$ is the active core thickness, d is the slow axis width of the lasing mode, and $\lambda$ is the lasing wavelength. Alternatively, an integrated version of the interconnection can be made using a glass gradient index (GRIN) lens. The fiber core ends can be fused to the GRIN lens on opposite sides with orthogonal orientation of the slow axes. The separation S between the fiber section ends is chosen to be equal to the single focal distance F of the GRIN lens, S=F, which is determined by a different relation $F \approx h_0 d n/\lambda$, where n is the refractive index of the lens material.

For both of the above optical realizations, the interconnector 112 transforms the near field from one core output to the far field at the next core input. If the relations for the focal lengths listed above are satisfied, the lowest-order planar-core mode (which is smooth over the entire area $h_0 \times d$ in the near field) is transformed into the focal spot of the same dimensions, $d \times h_0$, but with a rotation of the axes by 90°. The smaller dimension, the fast-axis height $h_o$, is transformed by the lens into the larger far-field spot of dimension d, while the larger dimension, the core width $w_m$, which corresponds to the $d/h_0$ lower divergence, appears in the focal plane as narrow as $F\lambda/h_0 = d$. Hence, 90° rotated ribbon orientations for the neighboring fibers provide, at the proper choice of the interconnectors, minimal loss for the lowest-order propagating mode, matching input- and output-beam spots accurately.

The interconnector essentially serves as a spatial filter to cut off the higher modes of the multimode cores that could appear due to fluorescence and ASE, as well as due to aberrations of the lowest mode by thermal and population distortions developed in every SHARC fiber section. If the planar core is manufactured as optically closed by TIR reflections at the edges, waveguide modes appear in the core channel with respect to the slow axis, too. For the slow-axis mode of number M, the angular divergence at the core output is M times above the diffraction limit, $\theta_M \approx M\theta_{Diff} \approx M(\lambda/d)$. As a result, in the far field the corresponding beam spot occupies a dimension $F\theta_M \approx Mh_0$, which is M times broader than the core thickness $h_0$. The effective loss factor for core-to-core coupling per every interconnector is about 1/M for the M-th mode. This provides a huge round-trip resonator loss factor for the higher-order modes, about $(1/M)^{2N}$, for the sectional flat fiber containing N interconnectors. The beauty of the spatial filter proposed is that it is robust against high power radiation, since it does not absorb rejected light, but directs it into the cladding.

Pumping Schemes

Both double-clad (cladding-pumped) and single-clad configurations are possible for the SHARC fiber of the present invention. In the illustrative embodiment of FIG. 4a, the glass foil 34 itself serves for pump guiding by means of TIR trapping at the outer borders with air (or with a cooling liquid as in the embodiment of FIG. 4b). The signal cladding is transparent for pump light, having a lower refractive index than the other materials within the inner cladding.

Alternatively, an advanced SHARC design may include an extra outer cladding (as shown in FIG. 3) to minimize pump beam loss by leaking through the sidewalls. The extra cladding can be desirable also if a solid-state cooling technique is used for heat removal through large surfaces of the ribbon to eliminate pump power loss due to partial absorption at reflection from a thermo-optical interface border.

All pumping techniques that are presently known for fiber lasers can be applied to the SHARC fiber of the present invention. In addition, the planar character of the active medium allows for advanced techniques that are not applicable to standard fibers.

Fiber lasers are typically pumped through the fiber ends. One obvious disadvantage of this standard method is a thermal overload of the splicing points and/or tapered multi-core bundles that combine the pump power into the common inner cladding. Overheating occurs due to the concentration of the pump power in a limited and finely structured area.

To solve this problem, alternative side-pumping schemes have been described, involving multiple pigtailed diode bars that are distributed along the fiber length. The fiber-pigtail ends were polished at a high angle of about 85° to the fiber axis, and optically connected to the outer cladding at the same angular tilt to match the NA of the pump-guiding channel. Using such multiple distributed pump-entry points allows one to control the pump intensity and, hence, the thermal load along the fiber length by proper choice of location and relative pump power at the pumping points. In particular, the thermal load can be made essentially homogeneous along the fiber comparing to the single-entry end-pumping case. A similar pumping scheme can be applied to the present invention. For more detailed descriptions of side-pumping schemes, see the following references:

*A High-Brightness Laser Beam From a Phase-Locked Multicore Yb-Doped Fiber laser Array* by P. K. Cheo, et al., IEEE PTL 13, 439 (2001);

*Recent Advances in High-Power Multicore Fiber Lasers* by P. K. Cheo, et al., Proceedings of SPIE, Vol. 5335, p. 106-115 (2004); and

*Nonlinear mode competition and phasing in Yb-doped fiber amplifier* by E. Bovhove, et al., Proceedings of SPIE, Vol. 5335, p. 151-157 (2004).

Figure 8:
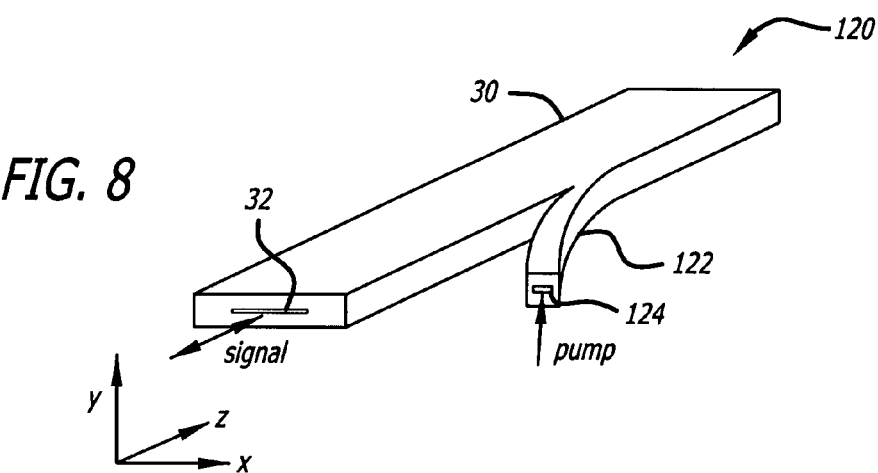
FIG. 8 is a simplified schematic of a fiber assembly with a novel pumping scheme designed in accordance with an illustrative embodiment of the present teachings.

FIG. 8 is a simplified schematic of a fiber assembly 120 with a novel pumping scheme designed in accordance with an illustrative embodiment of the present teachings. The fiber assembly 120 includes a SHARC fiber 30, as described above, with a plurality of pump-entry fiber pigtails 122 for coupling pump energy to the fiber 30.

FIG. 8 shows just one of a large number of pump-entry pigtails 122. In accordance with the present teachings, the fiber pigtails 122 each include a rectangular or high aspect ratio core 124 and look like freeway "on-ramps", coupling pump light into the edges of the fiber 30. Pump-diode light can be coupled into the on-ramp fiber pigtails 122 using techniques similar to those known in the art for coupling diode laser radiation into fiber pigtails. The difference in this case is that the pigtail on-ramps 122 are an integral part of the SHARC fiber 30 and also have rectangular cores 124 to match the anamorphic properties of the diode pump beams. These pump on-ramps 122 could be located along both edges of the fiber 30, and for typical fiber parameters (core and cladding sizes, laser-ion concentration, etc.) the pump absorption length can be as short as about 0.5 m.

The output of an edge-emitting diode bar also has a very high aspect ratio that typically requires reformatting the beam shape to match the conventional round core of typical pigtail fibers. The high aspect ratio pigtail fiber 122 of the present invention allows one to eliminate or simplify reformatting optics, up to direct butt coupling of the bar to the pigtail core.

Figure 9:
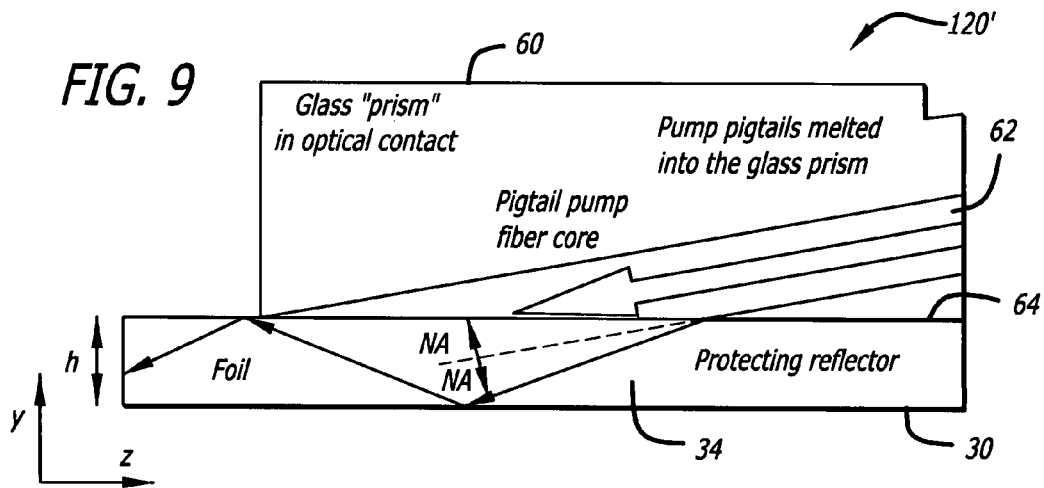
FIG. 9 is a simplified schematic of a fiber assembly with an alternate pumping scheme designed in accordance with an illustrative embodiment of the present teachings.

FIG. 9 is a simplified schematic of a fiber assembly 120' with an alternate pumping scheme designed in accordance with an illustrative embodiment of the present teachings. In this embodiment, glass prisms 60 are used to couple pump energy into the fiber 30. (Only one prism 60 is shown in FIG. 9.) The prisms 60 are placed in optical contact with the large surfaces of the inner cladding 34 (rather than attempting to couple the pump light through the outer cladding), or glued to it, and are distributed along the length of the fiber 30. The pump-coupling prisms 60 should be specially designed to be protected against leaking already coupled pump light back to the prism 60. For direct pumping from diode-laser bars, an anti-reflective (AR) coating can be deposited over the entire prism face except for a narrow line near the prism edge, through which the prism is placed in contact with the foil surface. The pump beam is then focused at a slanted angle as a narrow stripe onto the uncoated portion near the edge.

Optionally, a prism 60 may also be used to couple pump power that is delivered from diode bars though a fiber pigtail 62. As shown in FIG. 9, the prism 60 includes a few pigtail fibers 62 fused inside the prism 60 at a large angle to the polished prism surface to be attached to the foil surface. The pigtail fibers 62 can be conventional large, multi-mode fibers. The numerical aperture (NA) of the pump-fiber core should be no more than half of the NA of the planar pump guiding channel in the foil. The coupled fiber tilt angle with respect to the main core should be close to the NA of the pump fiber core to maximize coupling efficiency. In this embodiment, the perpendicular face of the prism 60, right behind the pump fiber tip as shown in FIG. 9, is polished out to the level of the pigtail fiber core side. The thickness h of the inner cladding 34 should be chosen to be less than the pump pigtail fiber diameter. This minimizes pump loss due to reflection of the pump from the inner cladding 34 back into the prism 60. The remaining portion of the contact face of the prism 60, beyond the pump core footprints, should be coated with a HR coating 64 (for large angles of incidence) to protect the prism 60 against back coupling of pump light from the upstream prisms. The pumping prisms 60 should be positioned beyond the planar area of the active core 32 near the fiber sides. This helps to avoid signal loss due to outcoupling light back into the prisms 60, and to protect the diode bars.

In the illustrative embodiments of FIGS. 8 and 9, the on-ramp fibers 122 and the prisms 60 are oriented facing the HR reflector 102 of the planar laser resonator to protect the fiber pigtails 62 against back coupling of the pump radiation. With this orientation, the main stream of the pump power is practically unidirectional, propagating downstream from the outcoupler end of the resonator to the HR reflector 102. The downstream pump cannot be back-coupled to the prisms 60 due to the protecting reflector 64 and due to the pigtail fibers' tilt orientation.

However, residual upstream pump energy that returns by the HR mirror 102 can still be coupled to the diode bars. To secure diode bar protection, the on-ramp entry regions and the pumping prisms can be concentrated closer to the outcoupler 104. This provides strong pump absorption on the way from the pumping points to the HR 102 and back. It results also in a concentration of pump energy closer to the outcoupler 104, where maximal power extraction is desired.

In the prism coupling embodiment, the input pump beams' orientation can be tilted relative to the laser resonator axis to control the pump absorption rate inside the foil. Stronger tilts for the prism located at the side of the core may increase the absorption rate per unit length of the fiber because of the longer path length where it crosses the core. The same method can be used for the preferred on-ramp implementation of the pumping scheme.

Fine Tuning and Additional Improvements

In the illustrative embodiments described above, single-mode guiding methods in the fast-axis direction on one hand, and resonator and/or gain-guiding methods in the slow-axis direction on the other, are used to achieve beam quality with the SHARC fiber laser. Alternatively, the SHARC fiber of the present invention can be designed to allow a few fast-axis modes (by, for example, increasing the thickness $h_0$ of the core), and then stripping methods can be employed to remove the higher-order modes. Coiling round-core fibers with a favorable coil radius to strip higher-order modes out of the core is a known method of mode control for fiber lasers. See, for example *Single-mode operation of a coiled multimode amplifier*, by J. P. Koplow et al., Opt. Lett. 25, 442 (2000).

The technique of coiling a fiber around a cylinder to strip higher-order modes could also be applied to the SHARC fiber of the present invention. Coiling maintains the single lowest-order mode propagation for the larger thickness of a few-mode core by imposing a relatively strong bend loss to the higher-order modes. The increased thickness $h_0$ of a few-mode guiding core may be very attractive if targeting higher output power applications.

The slow-axis resonator mode should also be tuned to compensate for manufacturing inaccuracies of the fiber. Slow-axis mode tuning can be used to compensate for any distortions induced by thermal gradients and the non-uniform inversion density in the gain medium. Entirely new options appear for slow-axis mode control due to manufacturing flexibility, together with the mechanical flexibility of the planar core fibers. In accordance with the present teachings, mode control tuning can be achieved by varying the planar core thickness and/or by twisting the planar core.

The thickness, $h_0$, of the planar core can be varied to control the slow-axis resonator Fresnel number and the mode structure. For adiabatic propagation of the trapped fast-axis mode, smooth thickness variations in the planar core effectively correspond to variations of phase velocity of the mode. Thinner regions allow a faster propagation speed of light along the fiber axis (lower effective index of the mode), while thicker regions slightly delay the light (larger mode index). This is because the phase velocity of the fiber modes increases for thinner waveguides, due to the fact that the modes then penetrate farther into the lower-index cladding. As a result, if the core is thicker at the middle of the ribbon than at the edges, the corresponding portion of the fiber demonstrates a planar focusing effect. If the core is thinner in the middle, the effective planar lens is negative. By applying a judicious profile to the core thickness, the shape of which can be deliberately controlled, the effective lens of the "cool" unpumped resonator can be pre-set to compensate for further light-induced thermal lensing that might obtain for the "hot" pumped resonator under operational conditions.

The SHARC fiber laser system may also be tuned by adding a mechanism for applying local and/or distributed twists of the fiber ribbon to create and control an effective negative planar lens in the laser resonator. The effective negative lens power is approximately proportional to the twist angle. A twisted portion of the flat fiber provides a defocusing effect as compared to the same fiber if it were not twisted. The reason is that the optical path near the ribbon edges becomes geometrically longer compared to the path along the fiber axis. The resulting defocusing power of this "twisted fiber lens" can be easily and smoothly tuned by controlling the twist angle. Distributed twisted regions operate as a planar version of the gradient index (GRIN) lens, but with adjustable focal strength.

The beauty of the twist method is the possibility of continuously controlling the effective Fresnel number of the planar resonator in real time, using appropriate feedback to achieve resonator optimization. This option is especially attractive for compensating thermal lensing and optical distortions arising from variations in the population inversion, since light induces both lensing phenomena, and, hence, they both vary together with the pump power and power-extraction conditions. Twists are especially effective for fine-tuning the lens compensation—to eliminate errors of the pre-set lens, and to compensate for dynamic lens variations.

In a preferred embodiment, the basic foil material around and outside of the core should be fabricated using a selectively absorbing dopant to absorb leaked light at the lasing wavelength. The dopant should be spectrally selective, having no absorption band at the pump wavelength. As an example, Sm could be the absorber for an Yb-doped active core. The absorber helps to reduce the gain for higher-order modes, which are stripped out through the core-cladding interfaces due to coiling. In addition, it helps to absorb the leaks through the edges of the optically open core. In the multi-sectional configuration shown in FIG. 7, it also reduces the gain for the higher-order modes that are rejected from the core of the next fiber section by the fiber-to-fiber interconnector. In addition, the absorber helps to reduce amplified spontaneous emission (ASE) that can be collected and accumulated in the pump-guiding foil. Leakage from the core to the foil can negatively impact laser efficiency if no cladding absorption is available. Specifically, unabsorbed ASE would be kept inside the foil by TIR reflections from the foil boundary, allowing this ASE to cross the active core multiple times and stealing a portion of pump power stored as population inversion.

In a preferred embodiment, the outcoupler end of the fiber is attached to a bulk piece of optically homogeneous glass to form a coreless end-cap. As is well known in the existing art, such an end-cap allows the beam to expand to a larger size, due to the fast-axis divergence. The larger beam size reduces the optical intensity at the output surface of the end-cap, thereby reducing the likelihood of optical damage at that surface. Since the beam divergence is so different in the fast- and slow-axis directions, the length $L_{ec}$ of the end-cap piece allows the control of the output beam shape even for cores having a very high aspect ratio. For example, one can generate a beam with a 1:1 aspect ratio if the length is chosen as $L_{ec} = dnh_0/\lambda$.

The angular divergence of the single-mode beam radiated from the planar core is very different for the fast and slow axes, because of the high aspect ratio of the near-field intensity profile. External cylindrical collimation optics are usually used to equalize the divergence at both axes for edge emitting diode lasers. See, for example, References 1-4 listed above. An external cylindrical collimating lens set right behind the end-cap after free-space propagation can be used for the planar core fiber output as well. In a preferred embodiment, the end-cap is fabricated to have an exit surface curved with a radius $R \approx (n-1)L_{ec}$ along the fast axis coordinate to collimate the generated beam without the need for external lenses.

In a preferred embodiment, a partially reflecting outcoupler that terminates the planar resonator (see FIG. 5a) can be formed by applying a dielectric coating with a specified reflectivity to a portion of the end-cap exit surface; the remainder of this surface will be antireflection-coated. The size and reflectance of the dielectric coating outcoupler will depend on the specific operational requirements of the SHARC fiber laser.

As an alternative, it is also possible to produce a partial reflector by means of V-grooves written into the large side surface of the SHARC fiber. V-grooves are well known in the existing art, and they can be formed, for instance, by scanning a focused $CO_2$ laser beam. The V-grooves should be oriented perpendicular to the fiber ribbon axis, and they could cover the entire width of the active core (in the slow-axis direction). The grooves can be made also on the opposite surfaces of the foil, one against another. The depth of the V-grooves is chosen to barely reach the core; it should be fine-tuned to provide the desired reflectivity of the outcoupler.

Additional components may also be integrated into the body of the fiber. For example, these additional components could include one or more of the following: reflectors for forming the laser cavity, end-caps, an optical modulator, polarization maintaining elements, polarization control elements, Bragg gratings, etc.

SHARC Fiber as a High Power Amplifier

In addition to being used to form a fiber laser, the SHARC fiber gain medium of the present invention can also be used as a high-power single-mode optical amplifier (if the HR and outcoupler resonator reflectors are absent) in a single- or multi-pass configuration. Without the resonator components, the resonator-based mode-selection mechanism cannot function. Instead, mode control can be achieved via a gain guiding mechanism, such as that described in *Propagation Modes in Gain-Guided Optical Fibers*, by A. E. Siegman, J. Opt. Soc. Am. A 20, 1617 (2003).

According to this mechanism, a high-quality output beam can be produced from a high-quality input beam by ensuring that an optimum slow-axis spatial overlap of the input signal beam with the narrow gain stripe of the amplifying core is maintained along the entire length of the fiber. Under these conditions, only that portion of the signal beam that has the highest beam quality will be efficiently amplified along the entire length of the fiber, while the distorted portions propagate out of the gain region.

A preferred method of gain guiding for the SHARC fiber is overfilling the core stripe by the input beam with respect to the slow-axis direction. In addition, the core length is chosen to exceed the Fresnel length corresponding to the input beam size. For such conditions, the higher modes, which can be excited by scattering by core imperfections or by deflection via core lens, experience much lower gain because of angular spreading and weak overlap with the gain stripe. At the same time, the high beam quality portion should stay compact to maintain good overlap with the core over the entire length.

If necessary, this mode-control mechanism can be facilitated using a pre-set planar lens produced by profiling the core thickness across the ribbon for coarse compensation of the thermal and population lens across the slow axis (as discussed above). In addition, ribbon twisting (as discussed above) can be used for precise compensation of any residual lensing and for dynamic compensation of the portion of the lens optical power, which is dependent on the pumping load.

Thus, in applications requiring an amplifier function, the gain medium is employed without the additional mirror and outcoupler. In this case the slow-axis beam quality of the output beam depends on that of the input beam and on the homogeneity of the fiber gain medium. The beam quality also benefits from gain guiding that is achieved using a judicious combination of the finite spatial width (in the slow-axis direction) and the long length of the gain stripe, along with the fact that the amplified signal will, by design, overfill the width of the gain stripe.

The multi-sectional axes-flipped design of the flat fiber, as shown in FIG. 7, can also be used as an optical-fiber power amplifier. Such an amplifier provides effective clean up of the propagating light by spatially filtering at the interconnectors. In fact, it is capable of amplifying the single lowest-order mode even when multimode input is presented. In a preferred embodiment, both a pre-set and a twist-induced lens can be used in separate sections of the compound amplifier as a method of loss control for the amplified beam. Loss control is useful for amplifier performance optimization, and also as a simple non-electrical method for controlling the output power at constant pump conditions.

Electrodes can be deposited on opposite surfaces of the SHARC fiber ribbon over its length to control and to modulate the phase of the amplified radiation. A control voltage differential applied to the opposite surfaces results in density modulation due to a ponderomotive force inside isotropic glass. Having no mechanical resistance from the slow-axis direction, only minor mechanical compression is required for deep phase modulation if the compressed area is distributed along the entire fiber length. The control voltage can be modulated over a broad bandwidth, up to 10 MHz, which is determined by the propagation time of a sound wave across the fast axis.

The SHARC fibers of the present invention can also be used as an array of parallel amplifiers or oscillators to increase the output power of a light source. For incoherent combining of the multiple fiber channels, the output beams should be aligned parallel resulting in proportional increase of overall power. Brightness stays the same here as for each individual channel, or below this value.

For coherent combining, the brightness can be increased in proportion to the number of channels. The brightness increase, as well as the beam wavefront control option, requires separate, active, phase control for every lasing or amplifying channel. This can be achieved by controlling the relative phases in different parallel amplifying SHARC fiber channels, which are seeded by splitting the radiation of a common single mode master oscillator. Phase control can be applied for forming a combined beam with a flat phase front by compensating static and dynamic phase increments gained in different channels. Phase control can also be used for steering the output beam and for pre-aberration of the array output to optimize its power delivery to a target.

A combined-cavity laser source can be formed using a few parallel SHARC fiber channels with strong optical coupling between them to make the laser oscillate on a single supermode by means of known supermode selection techniques. A single supermode output corresponds to a spatially coherent beam. However, if the output beam consists of a combination of supermodes, then the spatial structure of the combined beam will have a temporal variation at a bandwidth given by the phase noise in the separate channels.

CONCLUSION

Thus, the present teachings introduce a novel laser gain medium that configures the active medium as a semi-guiding high aspect ratio core fiber, in which a thin, doped planar core is buried inside a flexible ribbon-like glass foil. The optically pumped amplifying core is designed to provide index-based optical guiding in one direction only, across the small coordinate of the core (fast axis). If the size of the core in the fast-axis direction is big enough to allow more than one mode, the higher-order modes can be stripped out by forming the fiber into a coil with a specific radius that causes the latter modes to have a greater loss. In either case, index-based guiding in the core is deliberately avoided in the orthogonal transverse direction, aligned with the wide foil-plane coordinate (slow axis), although index-based anti-guiding in this direction may be used if needed to improve the signal beam quality. Single-mode operation for this axis is achieved by means of additional selectors that can be integrated into the same foil, or by a gain-guiding discrimination mechanism. Three illustrative selectors were described: (1) a HR mirror and compact outcoupler designed to form a long planar laser resonator with a Fresnel number below unity, (2) a HR mirror and curved outcoupler disposed to form a short unstable resonator, and (3) a multi-sectional design including a sequence of SHARC fibers with a 90 degree flip of the core plane from one fiber to the next, which are interconnected end to end with optics that transform the near-field profile from an output of one fiber to the far-field profile at the input of the next fiber. All mode selectors are made purely refractive, adding no absorption and hence, no heating to the fiber.

The SHARC fiber of the present invention is scalable in output power with a high beam quality to much higher levels than conventional designs. Analysis shows that the novel SHARC fiber laser is capable of generating up to 100 kW of high beam quality light per channel, providing maximal power efficiency at small size and light weight. As an example, for a single-mode channel with core thickness $h_0 \approx 20$ μm, and assuming a wavelength of 1 μm, the SHARC fiber resonator length L should be chosen according to the scaling law $L \approx 1.2 \cdot 10^4 w_a^2$, where $w_a$ is the width of the active core stripe and of the outcoupler. As a quantitative example, a 5 mm core width corresponds to a 30 m long resonator. The same analysis demonstrates that for an active core width $w_a$ more than 1.5 mm, the output power of the flat fiber laser is limited by the optical damage inside the fiber core. This limitation for the high power end results in the following scaling law: $P_{out} \approx (2h_0 d) \cdot I_{max}$, where $2h_0 d$ represents the area of the amplified beam, and $I_{max}$ should be chosen as a fraction of the threshold intensity for bulk optical damage in the fiber core. If $I_{max}$ is taken as a quarter of the damage threshold to guarantee safe operation, then for a CW laser/amplifier $I_{max} \approx 0.5$ W/μm$^2$. As an example, for a 20 μm by 5 mm core size, the expected maximal output power per single SHARC fiber channel is about 100 kW. For such a case, the output beam size along the slow axis is about 1 cm.

For an active core width $w_a$ less than 1.5 mm, SHARC fiber laser/amplifier operation will probably be limited by the available heat sink density, not by optical damage. This is because, for such core widths, the heat flow density Q through the ribbon surfaces will exceed the practical limit of about 100 W/cm$^2$. However, for wider core strips with $w_a$ greater than 1.5 mm, the heat-sink density should be less than 100 W/cm$^2$ if the output beam stays below optical damage threshold. Analysis shows that the required heat flow Q rapidly decreases as the second power of the core width: $Q \approx (P_{out}/2Lw_a)(1-\eta)/\eta \propto 1/w_a^2$. As an example, for 100 kW output power with a 5 mm wide core channel, the heat sink density drops down below 10 W/cm² making thermal management possible by air cooling. The possibility of employing air cooling allows laser designers to eliminate the heavy and expensive water cooling heat exchanger, and this makes the SHARC fiber laser design even more attractive.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser gain medium comprising:
an active core having a high aspect ratio cross-section with a fast-axis dimension and a slow-axis dimension;
first means for forming reflective boundaries at fast-axis boundaries of said core;
edge sections arranged at each slow-axis boundary of said active core, said edge sections comprising mode index matching material arranged in contact with and covering edge portions of said active core and edge portions of said first means only at each slow axis boundary;
an outer cladding portion arranged to surround the first means, the edge sections, and the active core,
wherein a thickness of said active core is chosen to control a fast-axis mode profile and a number of fast-axis modes propagating in said active core,
wherein said thickness of said active core is adapted to support one or more modes in said fast-axis direction; and
means for stripping any higher-order modes out of said active core, and
wherein said mode index matching material has a refractive index different from an active core index so that anti-guiding is provided at slow-axis boundaries of said active core, said mode index matching material being disposed only along the edge portions of said active core and the edge portions of said first means at each slow axis boundary.

2. The invention of claim 1 wherein said laser gain medium is an optical fiber.

3. The invention of claim 1 wherein said laser gain medium is fabricated from glass.

4. The invention of claim 1 wherein said first means includes signal claddings positioned in contact with said core to form said reflective boundaries.

5. The invention of claim 4 wherein said signal claddings have a refractive index less than a refractive index of said core such that light in said core is trapped by total internal reflection in said fast axis direction.

6. The invention of claim 5 wherein said refractive index of said signal claddings is reduced relative to that of said core by modifying dopant concentrations in said claddings.

7. The invention of claim 5 wherein said refractive index of said signal claddings is reduced relative to that of said core by including a micro-structure in said claddings.

8. The invention of claim 4 wherein said claddings include a micro-structure that traps light in said core according to principles of photonic bandgaps.

9. The laser gain medium of claim 1, wherein said thickness of said active core is matched to a numerical aperture of said core such that said core is a single-mode planar waveguide only in said fast-axis direction.

10. The laser gain medium of claim 1, wherein at least said active core is coiled with a coil radius that presents a relatively high loss to higher-order modes but a relatively low loss to a lowest-order mode.

11. The invention of claim 1, wherein said edge sections comprising mode index matching material disposed in contact with said slow-axis boundaries of said core have a refractive index such that said core has minimal reflections in said slow-axis direction,
wherein said edge sections comprising mode index matching material includes a material disposed in contact with said slow-axis boundaries of said core such that modes in said slow-axis direction are leaky,
wherein said material has a refractive index that is slightly greater than an effective refractive index of a preferred mode propagating in said core.

12. The laser gain medium of claim 11, wherein said preferred mode is a lowest-order mode.

13. The invention of claim 1 wherein width and gain value of said active core, and length of said gain medium are specified to achieve slow-axis mode control using mode filtering and gain guiding in the slow-axis direction.

14. A laser gain medium comprising:
an active core having a high aspect ratio cross-section with a fast-axis dimension and a slow-axis dimension;
first means for forming reflective boundaries at fast-axis boundaries of said core;
edge sections arranged at each slow-axis boundary of said active core, said edge sections comprising mode index matching material arranged in contact with and covering edge portions of said active core and edge portions of said first means only at each slow axis boundary;
an outer cladding portion arranged to surround the first means, the edge sections, and the active core,
wherein a thickness of said active core is chosen to control a fast-axis mode profile and a number of fast-axis modes propagating in said active core,
wherein said thickness of said active core is adapted to support one or more modes in said fast-axis direction;
means for stripping any higher-order modes out of said active core,
wherein said mode index matching material has a refractive index different from an active core index so that anti-guiding is provided at slow-axis boundaries of said active core, said mode index matching material being disposed only along the edge portions of said active core and the edge portions of said first means at each slow axis boundary; and
third means for providing an effective lens adapted to compensate for thermal lensing effects.

15. The invention laser gain medium of claim 14, wherein said third means comprises a fast-axis thickness profile of said active core along said slow-axis direction adapted to provide said effective lens.

16. An optical fiber comprising:
an active core having a high aspect ratio cross-section and including top and bottom wide interfaces and first and second narrow edge interfaces;
first and second signal claddings disposed in contact with said top and bottom interfaces, respectively, to form reflective boundaries at said top and bottom interfaces, respectively;
a mode-index matching material disposed only along the first and second narrow edge interfaces of said active core and said signal claddings; and
an outer cladding surrounding said core, said signal claddings, and said mode-index matching material, wherein said mode index matching material has a refractive index different from an active core index so that anti-guiding is provided at a slow-axis boundary of said core, said mode index matching material being disposed only along the first and second narrow edge interfaces with said core.

17. The optical fiber of claim 16 wherein said mode-index matching material has a refractive index that is approximately equal to an effective refractive index of a preferred mode propagating in said core.

18. The invention of claim 17 wherein said preferred mode is a lowest-order mode.

19. The invention of claim 16 wherein said signal claddings have a refractive index less than a refractive index of said core such that light in said core is trapped by total internal reflection at said top and bottom interfaces.

20. The invention of claim 19 wherein said refractive index of said signal claddings is reduced relative to that of said core by modifying dopant concentrations in said claddings.

21. The invention of claim 19 wherein said refractive index of said signal claddings is reduced relative to that of said core by including a micro-structure in said claddings.

22. The invention of claim 16 wherein said first and said signal claddings each include a micro-structure adapted to trap light in said core according to principles of photonic bandgaps.

23. An optical fiber comprising:
an active core having a high aspect ratio cross-section and including top and bottom wide interfaces and first and second narrow edge interfaces;
first and second signal claddings disposed in contact with said top and bottom interfaces, respectively, to form reflective boundaries at said top and bottom interfaces, respectively;
a mode-index matching material disposed only along the first and second narrow edge interfaces of said core and signal claddings, said mode-index matching material being selected to provide an effective mode index that minimizes reflections at said edge interfaces for a particular mode; and
an outer cladding surrounding said core, said signal claddings, and said mode-index matching material,
wherein a fast-axis thickness of said core is varied along a slow-axis direction to form an effective lens.

24. The invention of claim 16 wherein said active core width and gain value, and the length of said optical fiber are specified in such a manner to enable gain guiding in a slow-axis direction.

25. The invention of claim 16 wherein said fiber includes one or more additional components integrated into said fiber.

26. The invention of claim 25 wherein said components include one or more reflectors for forming a laser cavity integrated into said fiber.

27. The invention of claim 25 wherein said components include one or more polarization control elements integrated into said fiber.

28. The optical fiber of claim 16, further comprising an optical modulator integrated into said optical fiber.

29. A laser amplifier comprising:
a laser gain medium having an active core with a high aspect ratio cross-section and adapted to receive and amplify a laser input signal;
waveguiding means for mode control of said signal along a fast-axis direction of said core;
wherein a thickness of said active core is adapted to support one or more modes in said fast-axis direction;
a mode matching material positioned in contact with the active core; and
means for stripping out higher-order slow-axis modes from said active core,
wherein a refractive index of said mode matching material positioned in contact with said active core is selected to be different from a refractive index of the active core so as to minimize edge reflections of a particular mode along the slow-axis direction.

30. The laser amplifier of claim 29, wherein said laser gain medium is an optical fiber.

31. The invention of claim 29 wherein said waveguiding means includes signal claddings disposed in contact with fast-axis boundaries of said core.

32. The invention of claim 31 wherein said signal claddings have a refractive index less than a refractive index of said core such that light in said core is trapped by total internal reflection in said fast-axis direction.

33. The invention of claim 32 wherein said refractive index of said signal claddings is reduced relative to that of said core by modifying dopant concentrations in said claddings.

34. The invention of claim 32 wherein said refractive index of said signal claddings is reduced relative to that of said core by including a micro-structure in said claddings.

35. The invention of claim 31 wherein said claddings include a micro-structure adapted to trap light in said core according to principles of photonic bandgaps.

36. The invention of claim 29 wherein a thickness of said core is matched to a numerical aperture of said core such that said core is a single-mode planar waveguide in said fast-axis direction.

37. The laser amplifier of claim 29, wherein said laser gain medium is coiled with a coil radius adapted to present a relatively higher loss to higher-order fast-axis modes with respect to a lowest-order fast-axis mode.

38. The invention of claim 29 wherein said active core is optically open in said slow-axis direction.

39. The invention of claim 29 wherein said gain guiding means includes a homogeneous core.

40. A laser amplifier comprising:
a laser gain medium having an active core with a high aspect ratio cross-section and adapted to receive and amplify a laser input signal;
waveguiding means for mode control of said signal along a fast-axis direction of said active core,
wherein a thickness of said active core is adapted to support one or more modes in said fast-axis direction;
means for stripping out higher-order modes from said active core,
wherein said refractive index of said material positioned in contact with said active core is selected to provide an effective mode index that minimizes edge reflections of a particular mode along the slow-axis direction; and
means for providing an effective lens in said gain medium.

41. The laser amplifier of claim 40, wherein said means for providing an effective lens comprises a fast-axis thickness profile of said active core that varies along said slow-axis direction and thereby adapted to provide said effective lens.

42. The laser amplifier of claim 40, wherein said means for providing an effective lens comprises means for applying local and/or distributed twists of said laser gain medium to create and control a focal length of said effective planar lens.

43. The laser amplifier of claim 30, further comprising an end-cap fused to an end of said optical fiber that expands an output laser beam, wherein a length of said end-cap is selected so as to expand an elliptical laser output beam to an essentially circular laser output beam.

44. The invention of claim 43 wherein said end-cap has an exit surface that is shaped to control a divergence of said output laser beam.

45. The invention of claim 44 wherein said end-cap exit surface is shaped to collimate said output beam.

46. A method for generating laser energy, the method comprising:
providing an optical fiber having an active core with a high aspect ratio cross-section;
controlling modes propagating along a fast axis of said core using waveguiding; and
controlling modes propagating along a slow axis of said core using a resonator,
said resonator providing a Fresnel number less than unity so as to produce single-mode propagation in the slow-axis direction.

47. A method for controlling modes in a planar core fiber, the method comprising:
forming a fiber having an active core with a high aspect ratio cross section and
varying a thickness of said core across its wide dimension to form an effective planar lens in said fiber to compensate for thermal lensing effects only along a slow axis dimension in said fiber.

48. A method for controlling modes in a planar core fiber, the method comprising:
providing a fiber having an active core with a high aspect ratio cross section; and
applying local and/or distributed twists of said fiber to create and control an effective negative planar lens to compensate for thermal lensing and optical distortions in said fiber.

49. The laser amplifier of claim 29, wherein the mode matching material positioned in contact with said active core along the slow-axis direction has a refractive index selected with respect to a preferred mode propagating in said active core to minimize reflections of the preferred mode along edges of the active core.

50. The optical fiber of claim 16, wherein a refractive index of said active core is greater than a refractive index of each of said first and second signal claddings.

51. The laser amplifier of claim 43, wherein said end-cap is core-less and comprises optically homogeneous glass.

52. An optical fiber comprising:
an active core having a high aspect ratio cross-section and including top and bottom wide interfaces and first and second narrow edge interfaces;
first and second signal claddings disposed in contact with said top and bottom interfaces, respectively, to form reflective boundaries at said top and bottom interfaces, respectively;
a mode-index matching material disposed only along the first and second narrow edge interfaces of said active core and said signal claddings; and
an outer cladding surrounding said core, said signal claddings, and said mode-index matching material,
wherein said mode index matching material has a refractive index different from an active core index so that anti-guiding is provided at a slow-axis boundary of said core, said mode index matching material being disposed only along the first and second narrow edge interfaces with said core,
wherein said thickness of said active core is matched to a numerical aperture of said core such that said core is a single-mode planar waveguide only in said fast-axis direction.

53. An optical fiber comprising:
an active core having a high aspect ratio cross-section and including top and bottom wide interfaces and first and second narrow edge interfaces;
first and second signal claddings disposed in contact with said top and bottom interfaces, respectively, to form reflective boundaries at said top and bottom interfaces, respectively;
a mode-index matching material disposed only along the first and second narrow edge interfaces of said active core and said signal claddings; and
an outer cladding surrounding said core, said signal claddings, and said mode-index matching material,
wherein said mode index matching material has a refractive index different from an active core index so that anti-guiding is provided at a slow-axis boundary of said core, said mode index matching material being disposed only along the first and second narrow edge interfaces with said core,
wherein at least said active core is coiled with a coil radius that presents a relatively high loss to higher-order modes but a relatively low loss to a lowest-order mode.

54. The laser gain medium of claim 1, further comprising an end-cap fused to an end of said active core that expands an output laser beam, wherein a length of said end-cap is selected so as to expand an elliptical laser output beam to an essentially circular laser output beam.

55. The optical fiber of claim 16, further comprising an end-cap fused to an end of said active core that expands an output laser beam, wherein a length of said end-cap is selected so as to expand an elliptical laser output beam to an essentially circular laser output beam.

56. The laser amplifier_of claim 30, further comprising an end-cap fused to an end of said active core that expands an output laser beam, wherein a length of said end-cap is selected so as to expand an elliptical laser output beam to an essentially circular laser output beam.

57. The laser amplifier of claim 43, wherein the length of said end-cap is selected to transform the elliptical laser output beam entering the end-cap to an essentially circular laser output beam at an output of the end-cap.

58. The laser amplifier of claim 57, wherein the length of said end-cap is selected to provide an output at the output of the end-cap that has a 1:1 aspect ratio.

* * * * *